United States Patent [19]

Haldric et al.

[11] Patent Number: 4,916,971
[45] Date of Patent: Apr. 17, 1990

[54] DEVICE FOR THE PROGRESSIVE ANGULAR ADJUSTMENT OF THE KEYING OF A STEERING WHEEL ON A SHAFT WITH A LIMITATION IN THE TRAVEL

[75] Inventors: Bernard Haldric; Gregorio Benedi; Sylvie Baudon nee Chardons, all of Vendome, France

[73] Assignee: NACAM, Vendome, France

[21] Appl. No.: 327,774

[22] Filed: Mar. 23, 1989

[30] Foreign Application Priority Data

Mar. 25, 1988 [FR] France .................. 8803985

[51] Int. Cl.⁴ .............................. B62D 1/16
[52] U.S. Cl. ........................ 74/552; 74/432
[58] Field of Search ........ 74/552, 558, 484 R, 74/492; 29/159 B; 280/750, 777, 778, 731

[56] References Cited

U.S. PATENT DOCUMENTS 4,777,840  10/1988  Endo et al. .............. 23/159 B X

FOREIGN PATENT DOCUMENTS

| 148794 | 7/1985 | European Pat. Off. | 74/552 |
| 0233813 | 8/1987 | European Pat. Off. | 74/552 |
| 1094610 | 12/1960 | Fed. Rep. of Germany | 74/552 |
| 3400609 | 2/1985 | Fed. Rep. of Germany | 74/552 |
| 986776 | 8/1951 | France | 74/552 |
| 2527156 | 11/1983 | France | 74/552 |
| 2592925 | 7/1987 | France | 74/552 |
| 2616399 | 12/1988 | France | 74/552 |
| 21618 | of 1901 | United Kingdom | 74/552 |
| 191223 | 1/1923 | United Kingdom | 74/552 |
| 221060 | 9/1924 | United Kingdom | 74/552 |

Primary Examiner—Vinh T. Luong
Attorney, Agent, or Firm—Wenderoth, Lind & Ponack

[57] ABSTRACT

A hub (10) of a steering wheel and a terminal element (20) of a shaft are adapted to be interconnected by a wedging locking device (100) employing male and female cones and an axial clamping mechanism (200) employing a screw and a nut. A fine adjustment device includes at least one couple of pair of a groove (31) and a tongue (32) which extend longitudinally, are cooperative and complementary and adapted to be engaged one inside the other with confronting radial faces (301, 302) spaced apart from each other by a predetermined clearance, a toothed sector (33) and a confronting cavity (34) adapted to act as a semi-bearing for a gear pinion (35) capable of meshing with the toothed sector.

13 Claims, 1 Drawing Sheet

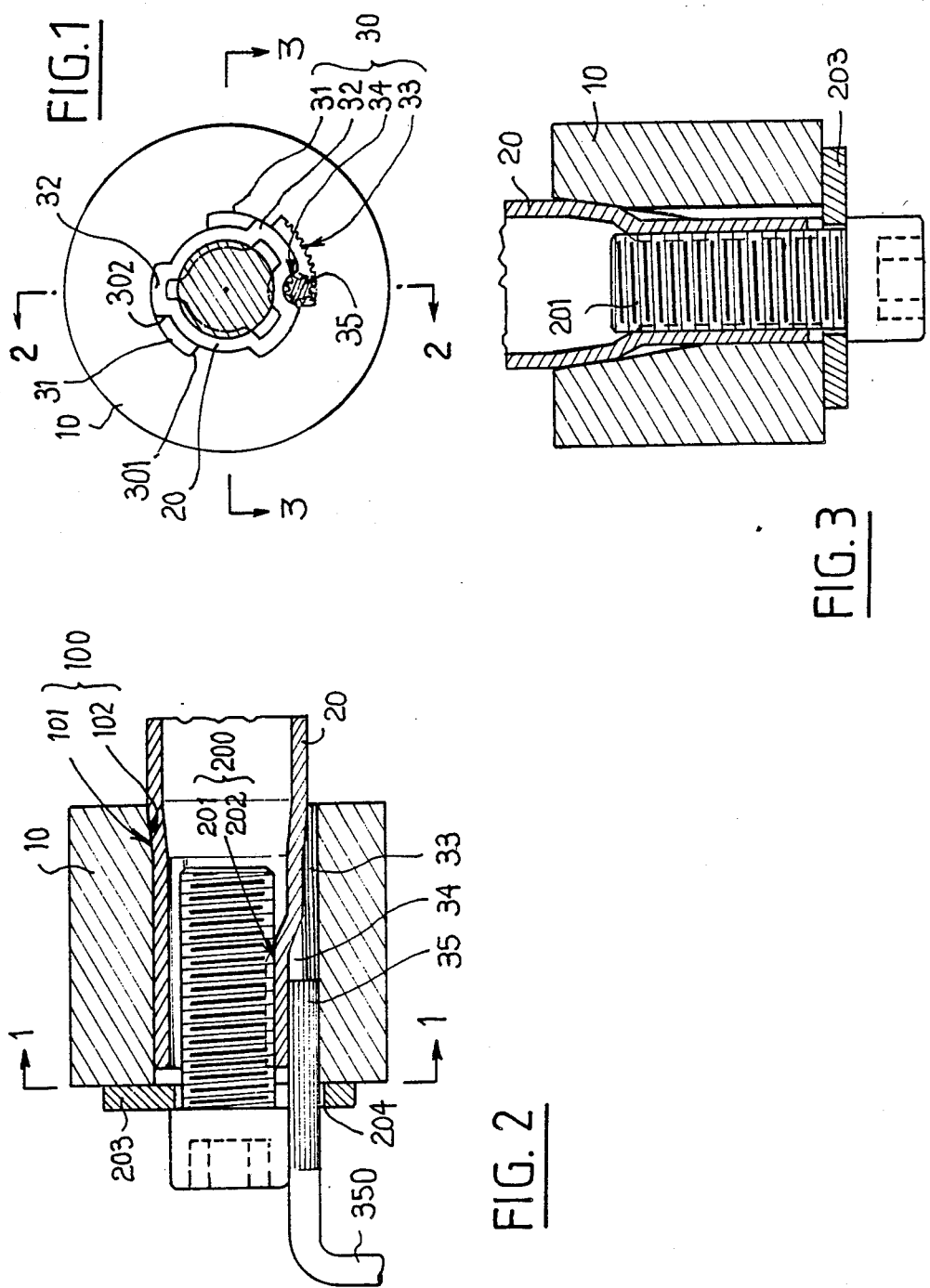

DEVICE FOR THE PROGRESSIVE ANGULAR ADJUSTMENT OF THE KEYING OF A STEERING WHEEL ON A SHAFT WITH A LIMITATION IN THE TRAVEL

BACKGROUND OF THE INVENTION

The invention relates to the adjustment of the angular keying or setting of coaxial elements such as for example a shaft and a steering wheel of, in particular, an automobile.

In certain applications, it is necessary to be able to choose the relative keying, in particular the angular keying, of a steering wheel on its shaft. This is the case for example in the automobile field.

As is known, steering wheels used for steering automobiles are usually fixed on the shaft of the steering column by means of splines associated with screw threads and cones. This permits transmitting, without play, the torque developed by the driver of the automobile to the road steering wheels. Some steering wheels are constructed in the form of a single-piece element and others are directly welded to the shaft.

For reasons of, in particular, appearance and comfort, it is necessary to be able to choose and fix, in particular at the moment of the construction of the vehicle, the initial relative angular keying of the steering wheel on its shaft. It may also be necessary to slightly readust this adjustment following maintenance or repair of the vehicle.

Such an angular keying essentially is for the purpose of causing the position of the road steering wheels of the vehicle corresponding to a straight-ahead travel to coincide with the symmetrical position of the branch or branches of the steering wheel relative to a plane parallel to the longitudinal median plane of the vehicle.

Indeed, it has been found that it was particularly disagreeable, and even sometimes a hindrance, for the driver when, with the road steering wheels oriented in the straight-ahead position, the steering wheel is not strictly in a comparable attitude.

As is known, such a strict keying is not easy to achieve directly on manufacturing lines or in the workshop and the techniques at present employed do not permit a convenient adjustment of this type.

Indeed, the steering wheel is usually mounted on its shaft of the steering column by means of an assembly comprising splines, usually including forty splines. This means that it is only possible to modify the relative positions of the steering wheel and shaft by a step of approximately 9°. When it is desired to obtain a progressive and continuous adjustment, it is therefore necessary to avoid the restriction imposed by splines. An interposed mechanism is then necessary.

Solutions already have been proposed.

For example, French patent No. 2,557,992 proposes employing an intermediate sleeve or socket placed between the steering wheel and the column. Additional members are also employed which are relatively complicated in structure and require machining of a relatively high precision. This solution is complex owing to its structure and its kinematics. Moreover, this solution requires an additional financial outlay for the additional parts and the labour, in particular for the assembly.

SUMMARY OF THE INVENTION

An object of the invention is to overcome most of these drawbacks by means of a simple and inexpensive device which permits an exact and progressive angular adjustment of a steering wheel with respect to its shaft and which does not require additional parts.

The invention provides a device for effecting a fine relative angular adjustment while limiting the extent of the circumferential travel of a hub of a steering wheel on the terminal element of a shaft which are adapted to be united by locking means employing wedging by male and female cones engaged one in the other and a screw-and-nut axial clamping mechanism. This device comprises at least one groove and a longitudinal tongue which are cooperative and complementary and adapted to be engaged one inside the other, one of these two elements being carried by the hub and the other by the end element and which have confronting radial surfaces spaced apart from each other by a given clearance and, also, a toothed sector and a confronting cavity adapted to act as a semi-bearing for a gear pinion capable of meshing with such toothed sector, one of the two elements comprising the sector and the gear pinion being located on the hub and the other on the end element.

BRIEF DESCRIPTION OF THE DRAWINGS

Further features of the invention will be apparent from the following description with reference to the accompanying drawing which are given solely by way of example and in which:

FIG. 1 is a sectional view taken in the plane 1—1 perpendicular to the axis of FIG. 2;

FIG. 2 is a meridian sectional view taken in the plane 2—2 of FIG. 1, and

FIG. 3 is a meridian section taken in the plane 3-3 of FIG. 1.

BRIEF DESCRIPTION OF THE INVENTION

The assembly of a steering wheel of an automobile on that shaft of the shafts of a steering column which is located in the compartment of the vehicle is well known in the art and only that which concerns the invention will be described hereinafter. For the rest, a person skilled in the considered art will be able to deduce from conventional arrangements available to him for providing solutions to situations he is confronted with.

As can be seen from the various Figures of the drawings, a hub 10 of a steering wheel (the whole of which is not shown) is adapted to be united with an end element 20 of a shaft of a steering column (only partly shown).

This hub 10 and this end element 20 are adapted to be immobilized relative to each other by wedging locking means 100 of a conventional type. These wedging locking means 100 comprise a female cone 101 of the hub 100 and a male cone 102 carried by the end element 20. As illustrated, these male and female cones are engaged one inside the other.

The wedging locking means 100 are brought into action by means of an axial clamping mechanism 200. This axial clamping mechanism is of relatively conventional type and comprises a bolt or screw 201 whose screw threads are adapted to screw into the tapping of a nut 202 formed inside the terminal or end element 20. Preferably, a washer 203 is interposed between the head of the screw and the surface of the hub, as illustrated.

The nut 202 is obtained, if need be, directly in the bore of the hollow terminal element 20; the tapping is effected by machining or by a forming operation in the conventional manner.

It will therefore be understood that, in tightening the screw 201 in its nut 202, an axial force is exerted which tends to block the male cone 102 of the terminal element 20 against the female cone 101 of the hub 10 so as to wedge them against each other and ensure the locking of the steering wheel on the shaft.

In order to permit the fine angular adjustment of the hub relative to the terminal element while limiting the extent of their relative circumferential travel, a device 30 according to the invention is employed.

As can be seen, this device 30 comprises at least one pair of grooves 31 and tongues 32 which extend longitudinally, are complementary and cooperative and adapted to be engaged one inside the other.

As can be seen, these grooves 31 and tongues 32 each present radial faces 301 and 302 respectively, which are placed in confronting relation to each other and are separated from each other by a predetermined clearance, as clearly shown in FIG. 1.

The device 30 according to the invention further comprises a toothed sector 33 and at least one cavity 34 placed in facing relation to the sector. This cavity 34 is adapted to act as a semi-bearing and to receive a gear pinion 35 capable of meshing with the toothed sector 33.

The grooves 31 and tongues 32 are for example in the form of a succession of grooves and projections which are obtained for example by a deformation of the terminal element 20. The complementary grooves and tongues of the hub 10 are obtained, for example, by machining or molding, in the conventional manner.

As can be seen, the grooves and tongues preferably are arranged in a polygonal configuration and are, for example, three in number, so as to have an approximately isosceles triangular configuration.

Preferably, the cavity 34 is disposed immediately between the two successive and contiguous projections or tongues 32 constituting the base of the isosceles triangular or one side of any other polygonal configuration.

Preferably, the cavity 34 has an at least semi-cylindrical configuration.

Furthermore, the pinion 35 is removable. For example, this pinion is connected in any suitable conventional manner, for example by welding, or formed on, the end of a tool such as a key 350, for example cranked, as shown in particular in FIG. 2.

Preferably, the washer 203 is provided with a recess 204 which permits the introduction of the pinion 35 in its cavity 34 so that it is meshed with the toothed sector 33.

According to an embodiment (not shown), the device according to the invention may comprise a single couple comprising a groove and a tongue. In this case, in particular, the cavity is then provided directly in the tongue. However, it will be noted that the same procedure may be adopted when there is more than one tongue.

It will now be explained how the device according to the invention may be employed for effecting a fine adjustment of the relative angular keying of the hub and terminal element.

It will be assumed that the hub 10 has been placed on the terminal element 20 and that the clamping mechanism 200 with its screw 201 and its washer 203 has been placed in position as illustrated.

The screw 201 is not tightened and has simply been rotated so that the male and female cones 101, 102 are not in wedged relation.

The engagement between the hub and the terminal element is facilitated by the isosceles triangular configuration of the grooves and tongues 31, 32 which thus achieve fool-proof initial positioning, since only one initial orientation is possible. This fool-proof function can also be obtained by using only a single couple comprising a groove and a tongue or a plurality of couples or pairs of grooves and tongues if care is taken to dispose them in accordance with a polygonal configuration which has no circumferential symmetry.

The gear pinion 35 which is located at the end of the key 350 then is inserted through the recess 204 in the washer 203 so as to place the pinion in the cavity 34 and cause it to mesh with the toothed sector 33. If need be, fool-proof means will ensure the correct initial orientation of the washer to facilitate the insertion of the pinion. It will therefore be understood that in turning the key to the right or to the left the hub and the terminal element are made to turn relative to each other and produce an angular offset. This angular offset is allowed within the limit defined by the travel allowed by the predetermined clearance between the confronting radial faces 301 and 302 of the grooves and tongues.

For the reason explained initially, the chosen angular travel is on the order of 9°. It is at least approximately equal to the pitch of the splines, if they are provided.

When this has been done, it is then sufficient to tighten the screw 201 to achieve locking by wedging between the male and female cones.

The device according to the invention also acts as safety means.

Indeed, if the axial clamping mechanism 200 happens to become accidentally untightened, such that the locking means by wedging has resultant play, permanence in steering by means of the steering wheel remains possible. Indeed, only a certain jerking or looseness would appear in steering owing to the existence of the clearance defined between the confronting radial faces whose distance apart corresponds to an arc having a subtended angle of a few degrees. This uncertainty in the steering will serve to warn the driver of an anomaly in the steering system.

In another way, an offset in the initially strict orientation may occur following an attempt to steal the vehicle by means of an exaggerated force exerted on the steering wheel or following striking the pavement or sidewalk when the wheels of the vehicle encounter a large step.

All the interest and all the advantages afforded by the invention will therefore be realized.

As will have been understood, the invention make it possible to effect a fine relative angular adjustment between the hub and the terminal element while limiting the extent of possible circumferential travel therebetween. It also provides a safety means while allowing an easy assembly without the use of complicated additional parts.

The described embodiment concerns more particularly a steering wheel for an automobile, but it will be understood that the scope of the invention is not limited to this particular application which was chosen merely by way of example.

We claim:

1. Device comprising, in combination with a steering wheel hub and a shaft terminal element for effecting a progressive angular adjustment between the steering wheel hub and the terminal element while limiting the extent of a circumferential relative travel between the hub and terminal element, locking means comprising a male cone and a female cone engaged one inside the other and a screw-and-nut axial clamping mechanism for creating a wedging between said cones for interconnecting the hub and terminal element, the device further comprising at least one groove and at least one tongue which are cooperative, complementary and extend longitudinally and adapted to engage one inside the other with confronting radial faces spaced from each other by a predetermined clearance, a toothed sector, means defining a confronting cavity for acting as a semi-bearing, and a gear pinion meshed with said toothed sector and engaged in said semi-bearing.

2. Device according to claim 1, comprising a plurality of said grooves and tongues in the form of a succesion of grooves and projections.

3. Device according to claim 1, wherein said groove and said tongue have no symmetry as concerns rotation so as to act as fool-proof means.

4. Device according to claim 2, wherein said grooves and said tongues are arranged in a polygonal configuration.

5. Device according to claim 4, wherein said grooves and said tongues are arranged in a triangular configuration.

6. Device according to claim 5, wherein said triangular configuration is isosceles.

7. Device according to claim 1, wherein said cavity is provided directly in said tongue.

8. Device according to claim 4, wherein said cavity is disposed immediately between two successive and contiguous tongues forming the polygon.

9. Device according to claim 2, wherein said grooves, said tongues and said cavity are produced by deformation of the terminal element.

10. Device according to claim 1, wherein said cavity has a configuration which is at the most substantially semi-cylindrical.

11. Device according to claim 1, wherein said gear pinion is removable.

12. Device according to claim 11, wherein said gear pinion is carried by the end of a tool.

13. Device according to claim 1, wherein said clamping mechanism comprises a washer interposed between the hub and the terminal element, said washer having a recess for the passage of said gear pinion.

* * * * *